US012647367B2

(12) United States Patent
Padebettu

(10) Patent No.: US 12,647,367 B2
(45) Date of Patent: Jun. 2, 2026

(54) CONTROL PACKET PRIORITY BASED ON SUBSCRIBER STATE

(71) Applicant: Juniper Networks, Inc., Sunnyvale, CA (US)

(72) Inventor: Venkatesh Padebettu, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 358 days.

(21) Appl. No.: 18/346,383

(22) Filed: Jul. 3, 2023

(65) Prior Publication Data

US 2025/0016106 A1      Jan. 9, 2025

(51) Int. Cl.
| | |
|---|---|
| *G06F 13/00* | (2006.01) |
| *H04L 45/50* | (2022.01) |
| *H04L 47/2408* | (2022.01) |
| *H04L 47/2466* | (2022.01) |

(52) U.S. Cl.
CPC .......... *H04L 47/2408* (2013.01); *H04L 45/50* (2013.01); *H04L 47/2466* (2013.01)

(58) Field of Classification Search
CPC . H04L 47/2408; H04L 45/50; H04L 47/2466; H04L 47/24; H04L 67/61; H04L 41/0604; H04W 28/12; H04W 28/02
USPC .......................... 709/235, 232–234, 207, 238
See application file for complete search history.

(56) References Cited

U.S. PATENT DOCUMENTS

| | | | | |
|---|---|---|---|---|
| 7,702,366 B2 * | 4/2010 | Suzuki | ................ | H04W 72/569 |
| | | | | 370/395.42 |
| 10,931,576 B2 * | 2/2021 | An | ........................ | H04L 47/33 |
| 11,116,025 B2 * | 9/2021 | Mochizuki | .............. | H04L 5/001 |
| 11,324,077 B2 * | 5/2022 | Pani | ........................ | H04L 12/66 |
| 12,069,757 B2 * | 8/2024 | Mochizuki | ............ | H04W 72/23 |
| 2007/0201501 A1 * | 8/2007 | Suzuki | ................ | H04W 72/569 |
| | | | | 370/412 |
| 2010/0226252 A1 * | 9/2010 | Gogic | ................... | H04W 28/02 |
| | | | | 370/236 |
| 2017/0359830 A1 * | 12/2017 | Miyashita | ............. | H04W 88/18 |
| 2019/0097927 A1 * | 3/2019 | An | ........................ | H04L 41/342 |
| 2020/0163140 A1 * | 5/2020 | Mochizuki | ........ | H04W 36/0069 |
| 2022/0061129 A1 * | 2/2022 | Pani | ........................ | H04L 12/66 |

FOREIGN PATENT DOCUMENTS

| | | | | | |
|---|---|---|---|---|---|
| EP | 4274343 A1 * | 11/2023 | ........ | H04W 36/0069 |

OTHER PUBLICATIONS

Extended European Search Report for Application No. EP23191380.7, mailed on Dec. 19, 2023, 08 pages.

* cited by examiner

*Primary Examiner* — Kenneth R Coulter
(74) *Attorney, Agent, or Firm* — Harrity & Harrity, LLP

(57) ABSTRACT

In some implementations, a network device may receive a control packet. The network device may determine a priority corresponding to a subscriber state of a client device associated with the control packet. The network device may assign the priority to the control packet. The network device may transmit the control packet.

20 Claims, 6 Drawing Sheets

600

100

130
Set an indication
of the priority in
the control packet

120
Determine a priority corresponding to
a subscriber state of a client device
associated with the control packet 140
Transmit the control packet 110
Receive a control packet

300

600

610 — Receive, by a network device, a control packet

620 — Determine, by the network device, a priority corresponding to a subscriber state of a client device associated with the control packet 630 — Assign, by the network device, the priority to the control packet 640 — Transmit, by the network device, the control packet

CONTROL PACKET PRIORITY BASED ON SUBSCRIBER STATE

BACKGROUND

Network devices, such as routers, relay packets through a network from a source to a destination. When the network experiences congestion, the network devices may drop the packets, which may alleviate the congestion. Dropped packets are not received by the destination.

SUMMARY

Some implementations described herein relate to a method. The method may include receiving, by a network device, a control packet. The method may include determining, by the network device, a priority corresponding to a subscriber state of a client device associated with the control packet. The method may include assigning, by the network device, the priority to the control packet. The method may include transmitting, by the network device, the control packet.

Some implementations described herein relate to a network device. The network device may include one or more memories and one or more processors. The one or more processors are to receive a control packet. The one or more processors are to determine a priority corresponding to a subscriber state of a client device associated with the control packet. The one or more processors are to assign the priority to the control packet. The one or more processors are to transmit the control packet.

Some implementations described herein relate to a non-transitory computer-readable medium that stores a set of instructions. The set of instructions, when executed by one or more processors of a network device, may cause the network device to receive a control packet. The set of instructions, when executed by one or more processors of the network device, may cause the network device to determine a priority corresponding to a subscriber state of a client device associated with the control packet. The set of instructions, when executed by one or more processors of the network device, may cause the network device to assign the priority to the control packet. The set of instructions, when executed by one or more processors of the network device, may cause the network device to transmit the control packet.

DETAILED DESCRIPTION

Figure 1:
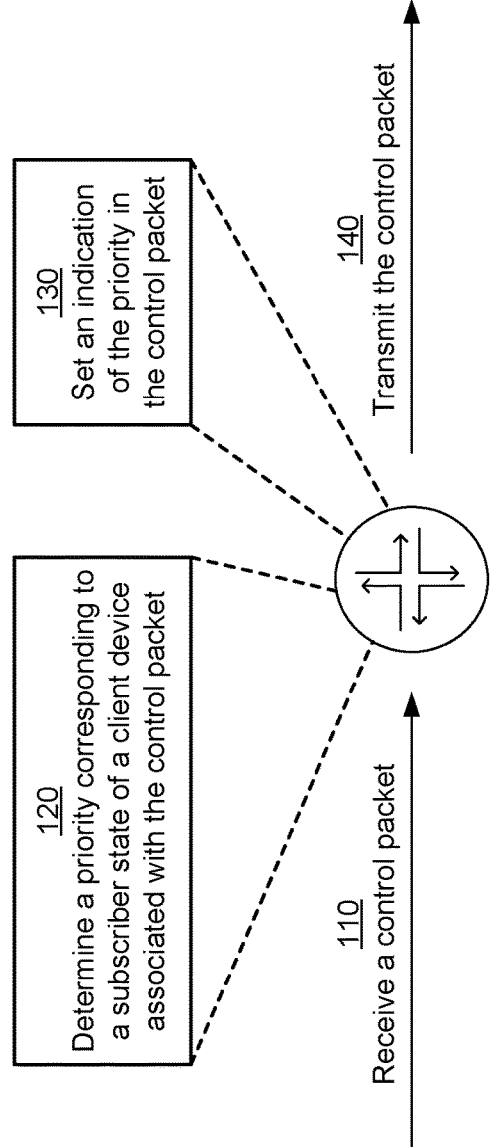
FIG. 1 is a diagram of an example implementation associated with control packet prioritization based on subscriber state.

The following detailed description of example implementations refers to the accompanying drawings. The same reference numbers in different drawings may identify the same or similar elements.

In a congested network, all control packets can have equal probabilities of being dropped. However, dropping some control packets can create more significant issues than dropping other control packets. For example, dropping a control packet associated with a client device in one stage of connection establishment can have more impact on that client device than the impact of dropping another control packet associated with another client device that is in another stage of connection establishment has on the other client device. For instance, the client device may experience a greater disruption to service when one control packet is dropped over another.

In some examples, dropping a first packet in a dynamic host configuration protocol (DHCP) or point-to-point protocol over Ethernet (PPPOE) exchange can have less impact than that of dropping an intermediary packet in the DHCP or PPPOE exchange. In some examples, a control packet associated with a client device in an established state (e.g., a renew packet) can have a lower impact when dropped as compared to the impact due to dropped closing (e.g., release) packets. In some examples, dropping keepalive/hello messages, which may be time-sensitive, can result in subscriber termination.

For instance, in a congested network, a first subscriber with an established network connection may send a DHCP renew control packet, and a second subscriber with an unestablished DHCP network connection may send a discover control packet. The network may treat the renew and discover control packets as having equal priority and, therefore, drop either packet with equal likelihood. However, if the discover control packet is dropped, then the client device can send a new discover control packet with relatively little disruption, whereas dropping the renew control packet can cause the network connection to be lost. Thus, the impact of the discover control packet being dropped can be less than the impact of the renew control packet being dropped.

Some implementations described herein enable prioritization of control packets based on a subscriber state associated with a client device that sends or receives the control packet. In some examples, a network device, such as a subscriber access device (e.g., access gateway function (AGF), broadband network gateway (BNG), or the like), may perform subscriber-state-aware packet prioritization on control packets. For example, the network device may dynamically assign priorities to the control packets based on the subscriber state of the client device associated with the control packet.

As a result, the subscriber state may serve as a proxy for the potential impact of dropping a given control packet, which may enable the network device to dynamically prioritize certain control packets over others. Thus, more-critical control packets may be handled with a higher priority than that of less-critical control packets. For example, based on the priorities assigned to the control packets, a congested network may drop a control packet having a lower priority instead of dropping a control packet having a higher priority, thereby reducing the overall impact of dropped control packets on client devices. Thus, prioritizing control packets based on subscriber state may help to prevent disruptive control traffic drops. For example, the prioritization of the control packets may help to avoid major impacts on client devices, such as requiring subscriber reconnections, due to dropped control packets.

FIG. 1 is a diagram of an example implementation 100 associated with control packet prioritization based on subscriber state. As shown in FIG. 1, example implementation 100 includes a network device (e.g., a subscriber access device, such as an AGF, BNG, a co-located BNG/AGF, or the like). The network device is described in more detail below in connection with FIGS. 2-5.

As shown by reference number 110, the network device may receive a control packet. The control packet may be any suitable control packet. In some examples, the control packet may be a DHCP control packet. Various DHCP control packets may be exchanged as part of a DHCP procedure by which a client device is assigned an internet protocol (IP) address. A DHCP procedure may involve transmission of discover, offer, request, and acknowledgement (DORA) packets. The client device may broadcast the discover packet, which may be an initial request for an IP address. The client device may receive, from a DHCP server, the offer packet, which may include an indication of an IP address offered by the DHCP server for allocation to the client device. The client device may broadcast the request packet, which may request the IP address indicated in the offer packet. The client device may receive, from the DHCP server, the acknowledgement packet, which may contain configuration information (e.g., lease duration) relating to the allocation of the IP address to the client device.

After the IP address has been assigned, the client device may transmit, to the DHCP server, one or more renew packets that request renewal of the lease for the IP address assigned to the client device. Additionally, or alternatively, the client device may transmit, to the DHCP server, a release packet that requests de-allocation of the IP address. The DHCP control packet received by the network device may include any of the DORA, renew, or release packets.

In some examples, the control packet may be a PPPOE control packet. Various PPPOE control packets may be exchanged to enable a client device to acquire an IP address. The PPPOE control packets may be exchanged during a PPPOE discovery stage and a PPPOE session stage. PPPOE control packets exchanged during the PPPOE discovery stage may include a PPPOE active discovery initiation (*PADI*) packet, a PPPOE active discovery offer (PADO) packet, a PPPOE active discovery request (PADR) packet, and a PPPOE active discovery session-confirmation (PADS) packet. The client device may broadcast the *PADI* packet, which may request a service. The client device may receive, from one or more servers (e.g., one or more access concentrators) that can provide the service, the PADO packet, which may contain information relating to the respective server and/or service. The client device may transmit, to one of the one or more servers, the PADR packet, which may indicate the service(s) requested from the entity. The client device may receive, from the server, the PADS packet, which may indicate whether the entity accepts or rejects the PPPOE session.

The PPPOE session stage may involve a point-to-point protocol (PPP) negotiation, which may involve the client sending a link control protocol (LCP) request packet, the client device receiving an LCP request acknowledgement packet, the client device sending an IP control protocol (IPCP) request packet, and the client device receiving an IPCP request acknowledgement packet. The LCP request and request acknowledgement packets may enable the client device to negotiate a PPP connection. The IPCP request and request acknowledgement packets may enable the client device to acquire an IP address for the PPPOE session.

Additionally, or alternatively, the client device may transmit PPPOE keepalive packets that prevent the PPPOE network connection from being lost. Additionally, or alternatively, the client device may transmit a PPPOE active discovery termination (PADT) packet, which may terminate the PPPOE session. The PPPOE control packet received by the network device may include any of the *PADI*, PADO, PADR, PADS, LCP request, LCP request acknowledgement IPCP request, IPCP request acknowledgement, keepalive, or PADT packets.

As shown by reference number 120, the network device determines a priority corresponding to a subscriber state of a client device associated with the control packet (e.g., the client device that sends or receives the packet). For example, the network device may determine a type of the control packet, such as any one of the DHCP or PPPOE control packets discussed above. Based on the type of the control packet (which may correspond to a subscriber state of the client device), the network device may determine the priority.

In some examples, the network device may determine the priority by identifying the priority from among a plurality of priorities. The plurality of priorities may include at least a first priority corresponding to an unknown subscriber state, a second priority corresponding to an initializing subscriber state, and a third priority corresponding to an established subscriber state. The unknown subscriber state may be a state in which the client has not attempted to establish a network connection (e.g., a state in which the client device has not attempted to acquire an IP address, such as via DHCP or PPPOE). The initializing subscriber state may be a state in which the client device is establishing a network connection (e.g., a state in which the client device is in the process of acquiring an IP address, such as via DHCP or PPPOE). The established subscriber state may be a state in which the client device has established the network connection (e.g., a state in which the client device has acquired the IP address, such as via DHCP or PPPOE).

The network device may classify a DHCP discover packet or a *PADI* packet as packets that are associated with the unknown subscriber state. The network device may classify a DHCP offer packet, a DHCP request packet, a DHCP acknowledgement packet, a PADO packet, a PADR packet, a PADS packet, PPP negotiation packets, or a keepalive packet sent before the conclusion of the PPP negotiation as packets that are associated with the initializing subscriber state. The network device may classify a DHCP renew packet, a DHCP release packet, a PADT packet, or a keepalive packet sent after the conclusion of the PPP negotiation as packets that are associated with the established subscriber state.

Identifying the priority from among a plurality of priorities may enable the network device to determine the priority corresponding to the subscriber state. Determining the priority corresponding to the subscriber state may enable the control packet to be prioritized according to the subscriber state, which may reduce the impact of a dropped control packet on a client device.

In some examples, the first priority (corresponding to the unknown subscriber state) may be lower than the second priority (corresponding to the initializing subscriber state), and the second priority may be lower than the third priority (corresponding to an established subscriber state). For example, a control packet associated with the first priority (e.g., a DHCP discover packet or a *PADI* packet) may have a lower priority than a control packet associated with the second priority (e.g., a DHCP offer packet, a DHCP request packet, a DHCP acknowledgement packet, a PADO packet, a PADR packet, a PADS packet, PPP negotiation packets, or a keepalive packet sent before the conclusion of the PPP negotiation), which may have a lower priority than a control packet associated with the third priority (e.g., a DHCP renew packet, a DHCP release packet, a PADT packet, or a keepalive packet sent after the conclusion of the PPP negotiation).

The first priority being lower than the second priority, and the second priority being lower than the third priority, may help to reduce the impact of a dropped control packet on the client device. For example, a control packet associated with the unknown subscriber state may be associated with the lowest priority because that control packet, if dropped, may have the lowest impact on the client device. A control packet associated with the initializing subscriber state may be associated with a medium priority because that control packet, if dropped, may have a medium impact on the client device. A control packet associated with the established subscriber state may be associated with the highest priority because that control packet, if dropped, may have the highest impact on the client device.

As shown by reference number 130, the network device may assign the priority to the control packet. As discussed in greater detail below with reference to FIG. 2, the network device may set one or more bits of the control packet. For example, the network device may set one nor more bits in a header of the control packet. The bit(s) may indicate the priority assigned to that control packet. Assigning the priority to the control packet may enable the control packet to be handled (e.g., dropped or not dropped) based on the priority.

In some examples, the priority assigned to the control packet may be higher than a priority associated with one or more data packets associated with the client device. For example, in addition to assigning priorities to control packets, the network device may also assign one or more priorities to data packets. In some examples, the network device may assign all data packets the same priority. Because a dropped data packet may have less impact than any dropped control packet, assigning the control packet a higher priority than a data packet may help to reduce impact on the client device by causing the data packet to be dropped before the control packet.

As shown by reference number 140, the network device transmits the control packet. As described in greater detail below in connection with FIG. 2, the network device may transmit the control packet to a network, such as a Layer 2 (L2) access network or an IP multiprotocol label switching (IP/MPLS) network. Transmitting the control packet may enable enforcement of the priority assigned to the control packet. For example, the network may enforce the priority assigned to the control packet. For example, network devices in the network (e.g., router, switch, or the like) may drop one or more control packets having a lower priority instead of dropping one or more control packets having a higher priority.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
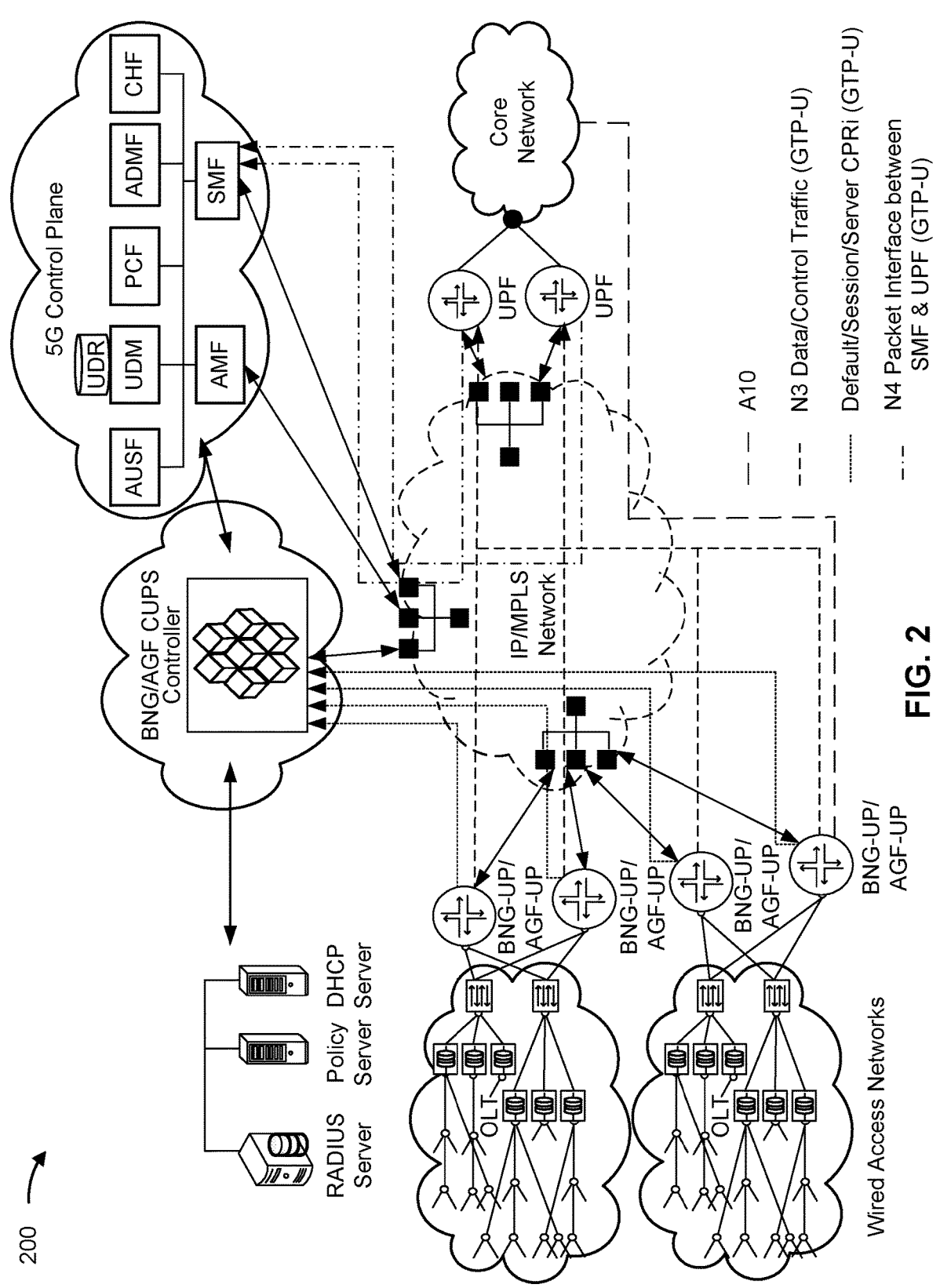
FIG. 2 is a diagram of an example environment associated with control packet prioritization based on subscriber state.

FIG. 2 is a diagram of an example environment 200 associated with control packet prioritization based on subscriber state. Environment 200 includes Layer 2 (L2) access networks (e.g., wired access networks), BNG user plane (BNG-UP)/AGF user plane (AGF-UP) devices, an IP/MPLS network, user plane functions (UPFs), and a core network. Environment 200 may further include a fifth generation (5G) control plane, a BNG/AGF control and user plane separation (CUPS) controller, and various servers configured to enable control plane operations (e.g., a remote authentication dial-in user service (RADIUS) server, a policy server, and a DHCP server).

A client device (e.g., a subscriber, customer premises equipment (CPE), a residential gateway (RG), a user equipment (UE), and/or the like) may connect to the core network over a wired access network using wireline access (e.g., transmission of information over a physical element, such as a fiber optic able, a coaxial cable, a twisted pair cable, and/or the like). The client device may transmit messages on the wireline access when the client device is connected to the core network using the wireline access. The wired access network may include an optical line terminal (OLT) that converts fiber optic signals (on the client-device side) to electrical signals (on the BNG-UP/AGF-UP-device side).

A BNG/AGF may route traffic to and from broadband remote access devices, such as digital subscriber line access multiplexers (DSLAMs), on an Internet service provider (ISP) network, and/or provide services such as marking, policing, and shaping. Environment 200 uses CUPS to split the BNG/AGF functionality into the BNG-UP/AGF-UP devices and the BNG/AGF CUPS controller (e.g., a control plane BNG/AGF device). The BNG-UP/AGF-UP devices may be co-located BNG-UP devices and AGF-UP devices.

The BNG-UP/AGF-UP devices may be examples of the network device shown in FIG. 1. For example, the BNG-UP/AGF-UP devices may receive a control packet, determine a priority corresponding to a subscriber state of a client device associated with the control packet, assign the priority to the control packet, and transmit the control packet.

In some examples, a BNG-UP/AGF-UP device may receive the control packet from the L2 access network and transmit the control packet to the IP/MPLS network. For example, the BNG-UP/AGF-UP device may encapsulate the control packet in a general packet radio service (GPRS) tunnelling protocol (GTP) user plane (GTP-U) header before transmitted the control packet to the IP/MPLS network. The BNG-UP/AGF-UP device may transmit control packets sent by the client device to the IP/MPLS network. For instance, in the case of DHCP control packets, the BNG-UP/AGF-UP device may transmit discovery packets, accept packets, renew packets, release packets, and/or the like to the IP/MPLS network.

The BNG-UP/AGF-UP device may transmit the control packet via a control packet redirect interface (CPRi), an N3 interface, an A10 interface, or the like. The CPRi may transport control packets between the BNG-UP/AGF-UP device and the BNG/AGF CUPS controller. The N3 interface may transport control packets (and/or data packets) between the BNG-UP/AGF-UP device (e.g., the AGF portion of the BNG-UP/AGF-UP device) and the UPF. The A10 interface may transport control packets between the BNG-UP/AGF-UP device (e.g., the BNG portion of the BNG-UP/

AGF-UP device, as the A10 interface may not be supported by the AGF portion of the BNG-UP/AGF-UP device) and the core network (e.g., bypassing the UPFs). For example, the A10 interface may be the core network connection from the BNG-UP/AGF-UP device (e.g., from the BNG portion of the BNG-UP/AGF-UP device) towards the Internet. The BNG-UP/AGF-UP device may transmit the control packet via the A10 interface in cases involving DHCP relay. A control packet transmitted via the CPRi or N3 interface may be encapsulated in a GTP-U header. A control packet transmitted via the A10 interface may be encapsulated in a generic routing encapsulation (GRE) header, IP security (IPSec) header, or the like.

In some examples, the control packet may be transmitted via an N4 interface. The N4 interface may transport control packets between a UPF and a session management function (SMF) in the 5G control plane. For example, the UPF may receive the control packet, with the priority indicated in the GTP-U header, from the BNG-UP/AGF-UP device via the N3 interface and transmit the control packet, with the same priority indicated in a GTP-U header, via the N4 interface.

The BNG-UP/AGF-UP device may assign the priority to the control packet by setting one or more differentiated services code point (DSCP) bits of the control packet or one or more multiprotocol label switching (MPLS) experimental bits of the control packet. The BNG-UP/AGF-UP device may set the DSCP bits or one or more MPLS experimental bits for control packets transmitted to the IP/MPLS network (e.g., via the CPRi, the N3 interface, the A10 interface, or the like). For example, the BNG-UP/AGF-UP device may override, on-the-fly, a DSCP bits default value (which may be the same for all control packets) with the DSCP bits value that corresponds to the subscriber state associated with the control packet. The DSCP bits may be located in the IP header of the GTP-encapsulated packet.

The BNG-UP/AGF-UP device may set the DSCP bits or one or more MPLS experimental bits of the control packet in the outer GTP-U header. For example, the BNG-UP/AGF-UP device may not alter the quality of service (QOS) flow identifier (QFI) in the GTP header or the DSCP of the subscriber packet (e.g., the inner packet encapsulated within the GTP-U header). Thus, the BNG-UP/AGF-UP device may not affect the inner packet. The BNG-UP/AGF-UP device may encapsulate the inner packet within the GTP-U header, and upon exiting the IP/MPLS, the GTP-U header may be stripped off the inner packet.

In some examples, a BNG-UP/AGF-UP device may receive the control packet from the IP/MPLS network and transmit the control packet to the L2 access network. The BNG-UP/AGF-UP device may transmit the control packet via a V interface or a Y5 interface. For example, the BNG functionality of the BNG-UP/AGF-UP device may transmit the control packet via the V interface and the AGF functionality of the BNG-UP/AGF-UP device may transmit the control packet via the Y5 interface. The BNG-UP/AGF-UP device may transmit control packets destined for the client device to the L2 access network. For instance, in the case of DHCP control packets, the BNG-UP/AGF-UP device may transmit offer packets, acknowledge packets, and/or the like to the L2 access network.

The BNG-UP/AGF-UP device may assign the priority to the control packet by setting one or more priority code point (PCP) bits (e.g., 802.1P bits) of the control packet. The BNG-UP/AGF-UP device may set the PCP bits for control packets transmitted to the L2 access network (e.g., via the V interface, the Y5 interface, or the like).

Thus, the priority assigned to the control packets may enable the control packets to be prioritized based on the subscriber state, which may improve the overall stability of the environment 200. In some examples, control packets exchanged between the BNG-UP/AGF-UP device and the BNG/AGF CUPS controller (e.g., on the CPRi) may be prioritized. In some examples, control packets exchanged between the BNG-UP/AGF-UP device and the UPF (e.g., on the N3 interface) may be prioritized. In some examples, control packets exchanged between the BNG-UP/AGF-UP device and the core network (e.g., on the A10 interface) may be prioritized. In some examples, control packets exchanged between the UPF and the SMF (e.g., on the N4 interface) may be prioritized. In some examples, control packets exchanged between the BNG-UP/AGF-UP device and the client device (e.g., on the V interface or the Y5 interface) may be prioritized. In some examples, the control packets may be prioritized based on a type of the control packets (e.g., whether the control packet is a keepalive packet or a release packet). In some examples, a packet exchanged between the BNG-UP/AGF-UP device and the UPF (e.g., on the N3 interface) may be prioritized based on whether the packet is a control packet or a data packet.

Figure 3:
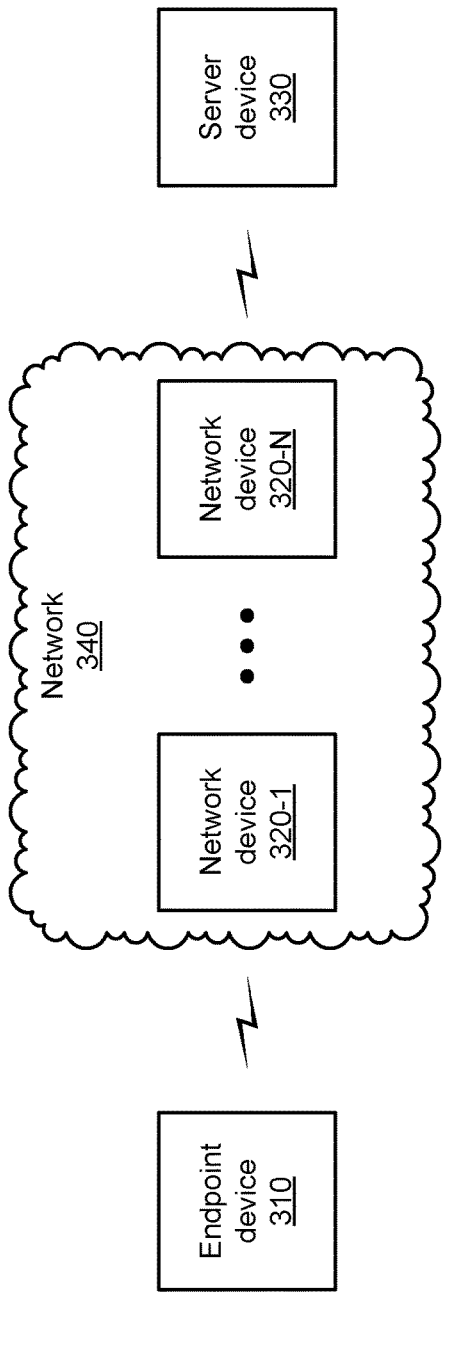
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an endpoint device 310, a group of network devices 320 (shown as network device 320-1 through network device 320-N), a server device 330, and a network 340. Devices of environment 300 may interconnect via wired connections, wireless connections, or a combination of wired and wireless connections.

Endpoint device 310 includes one or more devices capable of receiving, generating, storing, processing, and/or providing information, such as information described herein. For example, endpoint device 310 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 310 may receive network traffic from and/or may provide network traffic to other endpoint devices 310 and/or server device 330, via network 340 (e.g., by routing packets using network devices 320 as intermediaries).

Network device 320 includes one or more devices capable of receiving, processing, storing, routing, and/or providing traffic (e.g., a packet or other information or metadata) in a manner described herein. For example, one or more of network devices 320 may include a BNG (e.g., a BNG-UP), an AGF (e.g., an AGF-UP), a BNG/AGF (e.g., a BNG-UP/AGF-UP device), or the like. Additionally, or alternatively, network devices 320 may include a router, such as a label switching router (LSR), a label edge router (LER), an ingress router, an egress router, a provider router (e.g., a provider edge router or a provider core router), a virtual router, or another type of router. Additionally, or alternatively, network device 320 may include a gateway, a switch, a firewall, a hub, a bridge, a reverse proxy, a server (e.g., a proxy server, a cloud server, or a data center server), a load balancer, and/or a similar device. In some implementations, network device 320 may be a physical device implemented within a housing, such as a chassis. In some implementations, network device 320 may be a virtual device implemented by one or more computer devices of a cloud computing environment or a data center. In some implementations, a group of network devices 320 may be a group of data center nodes that are used to route traffic flow through network 340.

Server device 330 includes one or more devices capable of receiving, generating, storing, processing, and/or providing information, such as information described herein. For example, server device 330 may include a laptop computer, a tablet computer, a desktop computer, a group of server devices, or a similar type of device, associated with multicast traffic. In some implementations, server device 330 may receive information from and/or transmit information (e.g., multicast traffic) to endpoint device 310, via network 340 (e.g., by routing packets using network devices 320 as intermediaries).

Network 340 includes one or more wired and/or wireless networks. For example, network 340 may include a packet switched network, a cellular network (e.g., a 5G network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
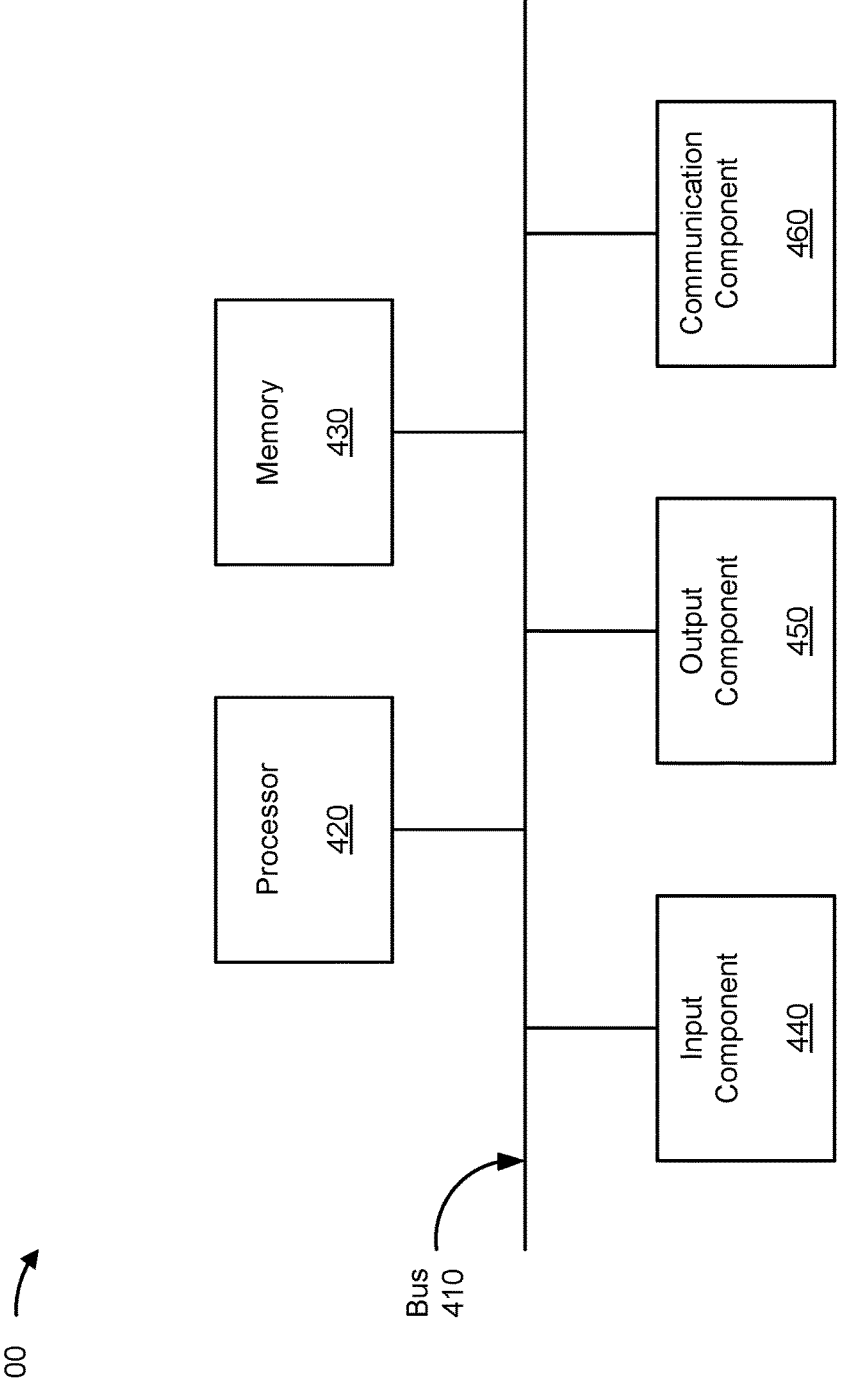
FIG. 4 is a diagram of example components of a device associated with control packet prioritization based on subscriber state.

FIG. 4 is a diagram of example components of a device 400 associated with control packet prioritization based on subscriber state. The device 400 may correspond to the network device shown in FIG. 1, a BNG-UP/AGF-UP device shown in FIG. 2, network device 320, or the like. In some implementations, the network device shown in FIG. 1, a BNG-UP/AGF-UP device shown in FIG. 2, and/or network device 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
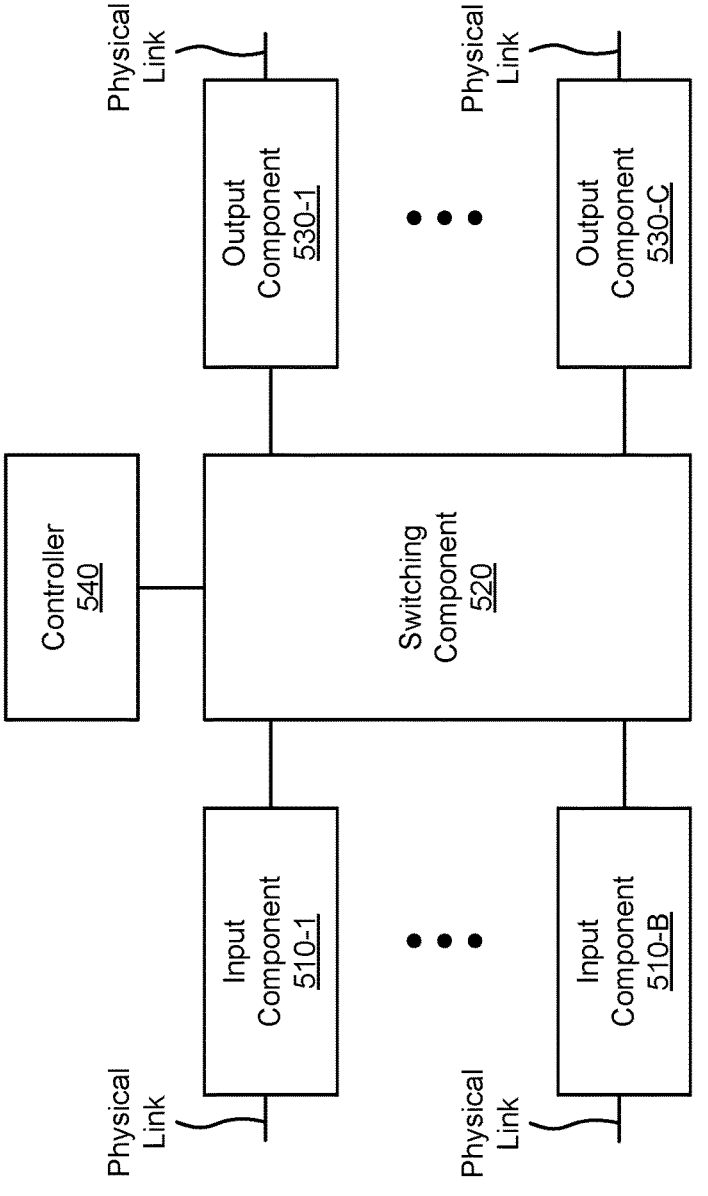
FIG. 5 is a diagram of example components of a device associated with control packet prioritization based on subscriber state.

FIG. 5 is a diagram of example components of a device 500 associated with control packet prioritization based on subscriber state. Device 500 may correspond to the network device shown in FIG. 1, a BNG-UP/AGF-UP device shown in FIG. 2, and/or network device 320. In some implementations, the network device shown in FIG. 1, a BNG-UP/ AGF-UP device shown in FIG. 2, and/or network device 320 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
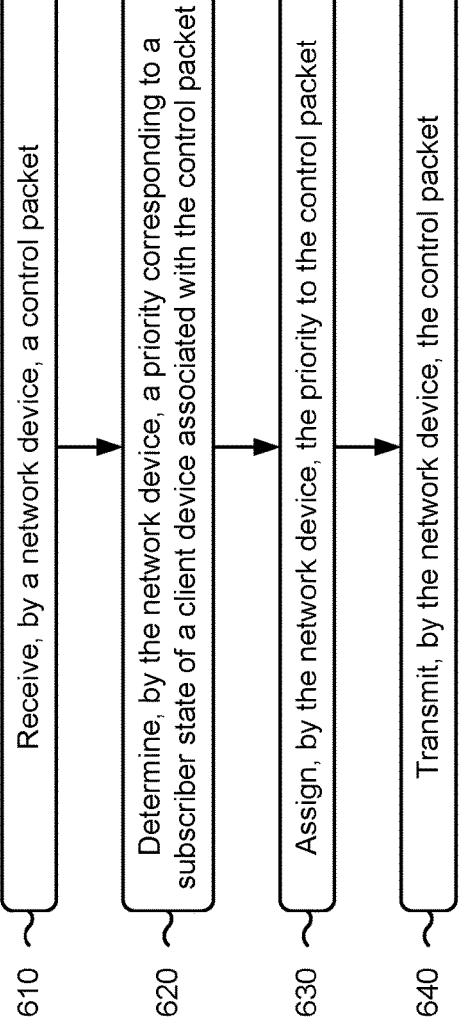
FIG. 6 is a flowchart of an example process associated with control packet prioritization based on subscriber state.

FIG. 6 is a flowchart of an example process 600 associated with control packet prioritization based on subscriber state. In some implementations, one or more process blocks of FIG. 6 are performed by a network device (e.g., network device 400 or network device 500). In some implementations, one or more process blocks of FIG. 6 are performed by another device or a group of devices separate from or including the network device, such as an endpoint device (e.g., endpoint device 310), a network device (e.g., network device 320), and/or a server device (e.g., server device 330). Additionally, or alternatively, one or more process blocks of FIG. 6 may be performed by one or more components of device 400, such as processor 420, memory 430, input component 440, output component 450, or communication component 460, or by one or more components of device 500, such as input component 510, switching component 520, output components 530, or controller 540.

As shown in FIG. 6, process 600 may include receiving a control packet (block 610). For example, the network device may receive a control packet, as described above.

As further shown in FIG. 6, process 600 may include determining a priority corresponding to a subscriber state of a client device associated with the control packet (block 620). For example, the network device may determine a priority corresponding to a subscriber state of a client device associated with the control packet, as described above.

As further shown in FIG. 6, process 600 may include assigning the priority to the control packet (block 630). For example, the network device may assign the priority to the control packet, as described above.

As further shown in FIG. 6, process 600 may include transmitting the control packet (block 640). For example, the network device may transmit the control packet, as described above.

Process 600 may include additional implementations, such as any single implementation or any combination of implementations described below and/or in connection with one or more other processes described elsewhere herein.

In a first implementation, determining the priority includes identifying the priority from among a plurality of priorities including at least a first priority corresponding to an unknown subscriber state, a second priority corresponding to an initializing subscriber state, and a third priority corresponding to an established subscriber state.

In a second implementation, alone or in combination with the first implementation, the first priority is lower than the second priority, and the second priority is lower than the third priority.

In a third implementation, alone or in combination with one or more of the first and second implementations, transmitting the control packet includes transmitting the control packet to an L2 access network.

In a fourth implementation, alone or in combination with one or more of the first through third implementations, assigning the priority to the control packet comprises setting one or more PCP bits of the control packet.

In a fifth implementation, alone or in combination with one or more of the first through fourth implementations, the priority is higher than a priority associated with one or more data packets associated with the client device.

In a sixth implementation, alone or in combination with one or more of the first through fifth implementations, the control packet is a DHCP control packet.

In a seventh implementation, alone or in combination with one or more of the first through sixth implementations, the control packet is a PPPOE control packet.

In an eighth implementation, alone or in combination with one or more of the first through seventh implementations, transmitting the control packet includes transmitting the control packet to an IP/MPLS network.

In a ninth implementation, alone or in combination with one or more of the first through eighth implementations, assigning the priority to the control packet includes setting one or more DSCP bits of the control packet.

In a tenth implementation, alone or in combination with one or more of the first through ninth implementations, assigning the priority to the control packet includes setting one or more MPLS experimental bits of the control packet.

In a eleventh implementation, alone or in combination with one or more of the first through tenth implementations, transmitting the control packet includes transmitting the control packet via a CPRi.

In a twelfth implementation, alone or in combination with one or more of the first through eleventh implementations, transmitting the control packet includes transmitting the control packet via an N3 interface.

In a thirteenth implementation, alone or in combination with one or more of the first through twelfth implementations, transmitting the control packet includes transmitting the control packet via an A10 interface.

In a fourteenth implementation, alone or in combination with one or more of the first through thirteenth implementations, the control packet is transmitted via an N4 interface.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by a network device, a control packet;

determining, by the network device, a priority corresponding to a subscriber state of a client device that sends or receives the control packet;

assigning, by the network device, the priority to the control packet;

encapsulating, by the network device and without altering a quality of service flow identifier or a differentiated services code point value, the control packet in a header that includes an indication of the assigned priority; and transmitting, by the network device, the control packet.

2. The method of claim 1, wherein determining the priority includes:

identifying the priority from among a plurality of priorities including at least a first priority corresponding to an unknown subscriber state, a second priority corresponding to an initializing subscriber state, and a third priority corresponding to an established subscriber state.

3. The method of claim 2, wherein the first priority is lower than the second priority, and wherein the second priority is lower than the third priority.

4. The method of claim 1, wherein transmitting the control packet includes:

transmitting the control packet to a Layer 2 (L2) access network.

5. The method of claim 1, wherein assigning the priority to the control packet comprises:

setting one or more priority code point (PCP) bits of the control packet.

6. The method of claim 1, wherein the priority is higher than a priority associated with one or more data packets associated with the client device.

7. The method of claim 1, wherein the control packet is a dynamic host configuration protocol (DHCP) control packet.

8. The method of claim 1, wherein the control packet is a point-to-point protocol over Ethernet (PPPoE) control packet.

9. A network device, comprising:

one or more memories; and one or more processors to:

receive a control packet;

determine a priority corresponding to a subscriber state of a client device that sends or receives the control packet;

assign the priority to the control packet;

encapsulate the control packet in a header that includes an indication of the assigned priority; and transmit the control packet.

10. The network device of claim 9, wherein the one or more processors, to transmit the control packet, are to:

transmit the control packet to an internet protocol multiprotocol label switching (IP/MPLS) network.

11. The network device of claim 9, wherein the one or more processors, to assign the priority to the control packet, are to:

set one or more differentiated services code point (DSCP) bits of the control packet.

12. The network device of claim 9, wherein the one or more processors, to assign the priority to the control packet, are to:

set one or more multiprotocol label switching (MPLS) experimental bits of the control packet.

13. The network device of claim 9, wherein the one or more processors, to transmit the control packet, are to:

transmit the control packet via a control packet redirect interface (CPRi).

14. The network device of claim 9, wherein the one or more processors, to transmit the control packet, are to:

transmit the control packet via an N3 interface.

15. The network device of claim 9, wherein the one or more processors, to transmit the control packet, are to:

transmit the control packet via an A10 interface.

16. The network device of claim 9, wherein the control packet is transmitted via an N4 interface.

17. A non-transitory computer-readable medium storing a set of instructions, the set of instructions comprising:

one or more instructions that, when executed by one or more processors of a network device, cause the network device to:

receive a control packet;

determine a priority corresponding to a subscriber state of a client device that sends or receives the control packet;

assign the priority to the control packet;

encapsulate the control packet in a header that includes an indication of the assigned priority; and transmit the control packet.

18. The non-transitory computer-readable medium of claim 17, wherein the one or more instructions, that cause the network device to determine the priority, cause the network device to:

identify the priority from among a plurality of priorities including at least a first priority corresponding to an unknown subscriber state, a second priority corresponding to an initializing subscriber state, and a third priority corresponding to an established subscriber state.

19. The non-transitory computer-readable medium of claim 17, wherein the one or more instructions, that cause the network device to transmit the control packet, cause the network device to:

transmit the control packet to a Layer 2 access network.

20. The non-transitory computer-readable medium of claim 17, wherein the one or more instructions, that cause the network device to transmit the control packet, cause the network device to:

transmit the control packet to an internet protocol multiprotocol label switching (IP/MPLS) network.

* * * * *